(12) United States Patent
Holler et al.

(10) Patent No.: US 9,220,199 B2
(45) Date of Patent: Dec. 29, 2015

(54) CROP LIFTER

(71) Applicant: Gebr. Schumacher Geratebaugesellschaft mbH, Eichelhardt (DE)

(72) Inventors: Frank Holler, Stein Wingert (DE); Friedrich-Wilhelm Schumacher, Birnbach (DE)

(73) Assignee: Gebr. Schumacher Geratebaugesellschaft mbH, Eichelhardt (DE)

( * ) Notice: Subject to any disclaimer, the term of this patent is extended or adjusted under 35 U.S.C. 154(b) by 223 days.

(21) Appl. No.: 13/739,281

(22) Filed: Jan. 11, 2013

(65) Prior Publication Data

US 2013/0180226 A1 Jul. 18, 2013

(30) Foreign Application Priority Data

Jan. 13, 2012 (DE) .................. 10 2012 100 302

(51) Int. Cl.
*A01D 65/00* (2006.01)
*A01D 65/02* (2006.01)

(52) U.S. Cl.
CPC ....................... *A01D 65/02* (2013.01)

(58) Field of Classification Search
CPC ........ A01D 65/00; A01D 65/02; A01D 41/14
USPC .................... 56/312, 313, 314, 319
See application file for complete search history.

(56) References Cited

U.S. PATENT DOCUMENTS

| | | | |
|---|---|---|---|
| 1,123,632 A | | 1/1915 | Weisgarber |
| 1,202,084 A | | 10/1916 | Merkel |
| 1,797,682 A | | 3/1931 | Gaterman |
| 2,099,471 A | * | 11/1937 | Edgington ............... 56/312 |
| 2,294,646 A | * | 9/1942 | Young ...................... 56/313 |
| 2,484,704 A | * | 10/1949 | Girodat .................... 56/312 |
| 2,734,332 A | | 2/1956 | Fisher |
| 2,892,298 A | * | 6/1959 | Chaney ..................... 56/314 |
| 3,965,659 A | | 6/1976 | Schumacher, II et al. |
| 4,887,419 A | * | 12/1989 | Bouin ....................... 56/319 |

FOREIGN PATENT DOCUMENTS

| | | |
|---|---|---|
| DE | 320550 | 4/1920 |
| DE | 864637 | 1/1953 |
| DE | 1 507 366 | 6/1969 |
| DE | 1482880 | 10/1969 |
| DE | 2 325 916 | 12/1974 |
| DE | 3300769 | 7/1984 |
| WO | WO2006/072158 | 7/2006 |

* cited by examiner

*Primary Examiner* — Robert Pezzuto
(74) *Attorney, Agent, or Firm* — Harness, Dickey & Pierce, P.L.C.

(57) ABSTRACT

A crop lifter for a mower of a harvesting machine has a support bar attachable to the mower. The support bar has a carrier. A lifter rod is detachably mounted on the carrier. The lifter rod is connectable at a multitude of positions to the carrier distanced in the longitudinal direction of the lifter rod, to the carrier.

10 Claims, 8 Drawing Sheets

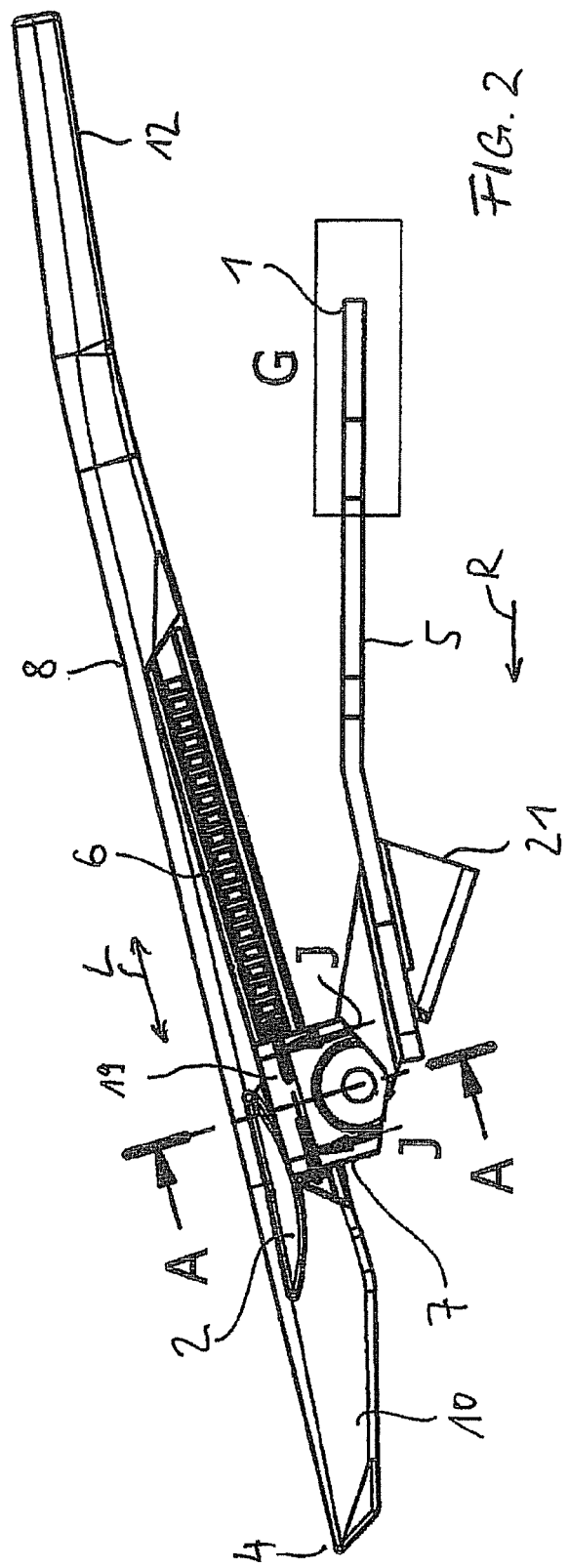
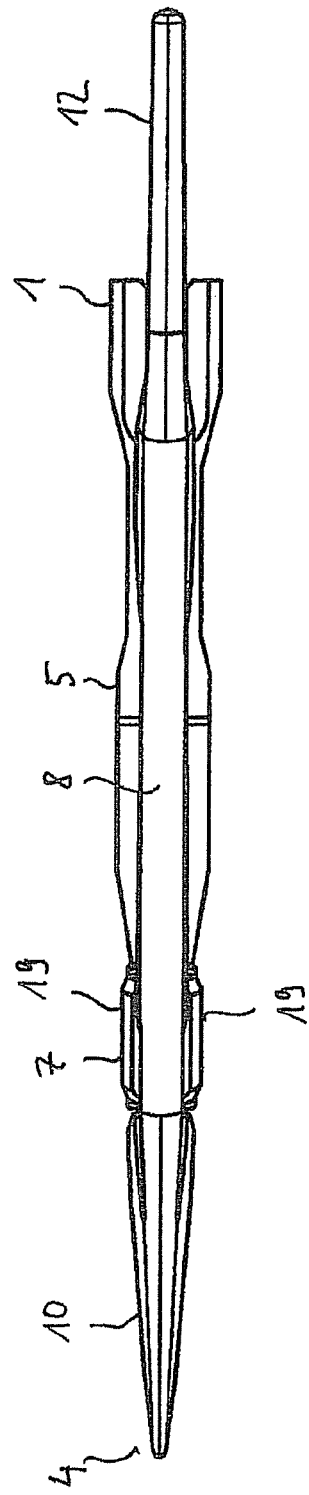

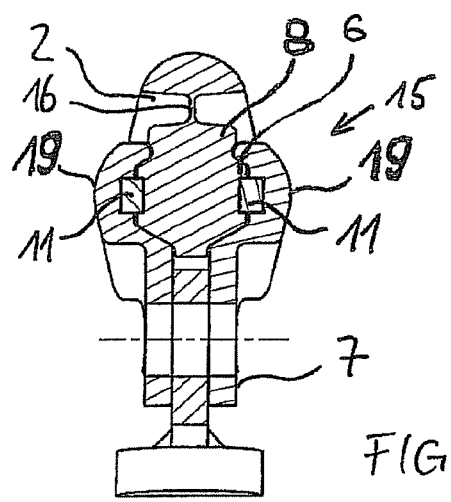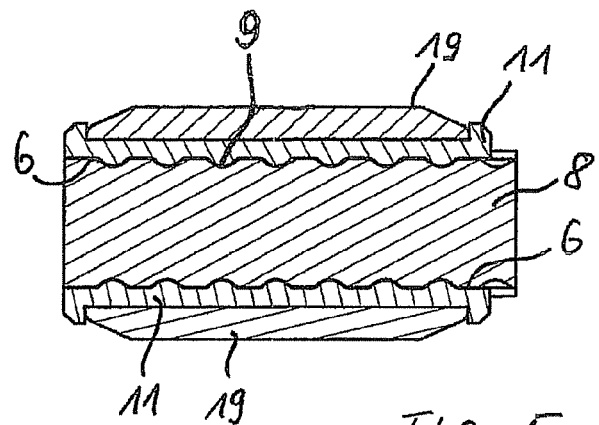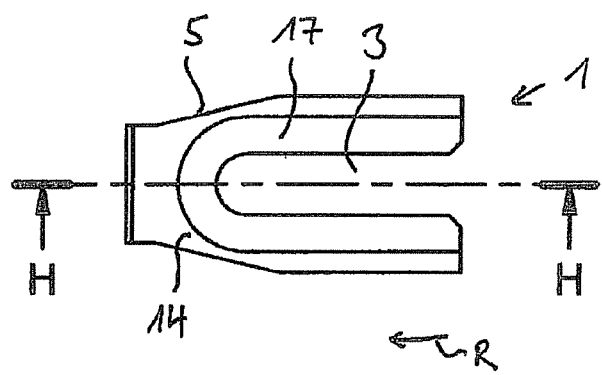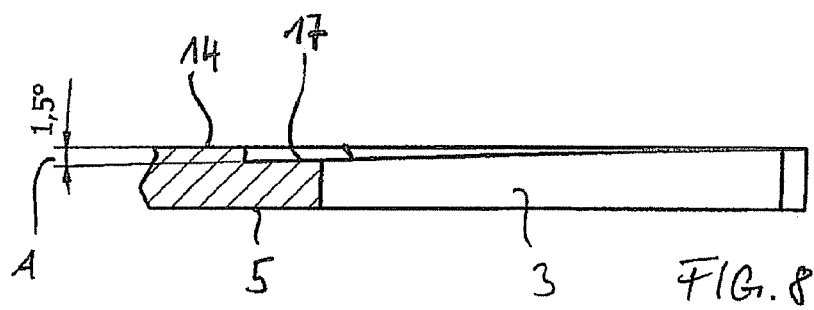

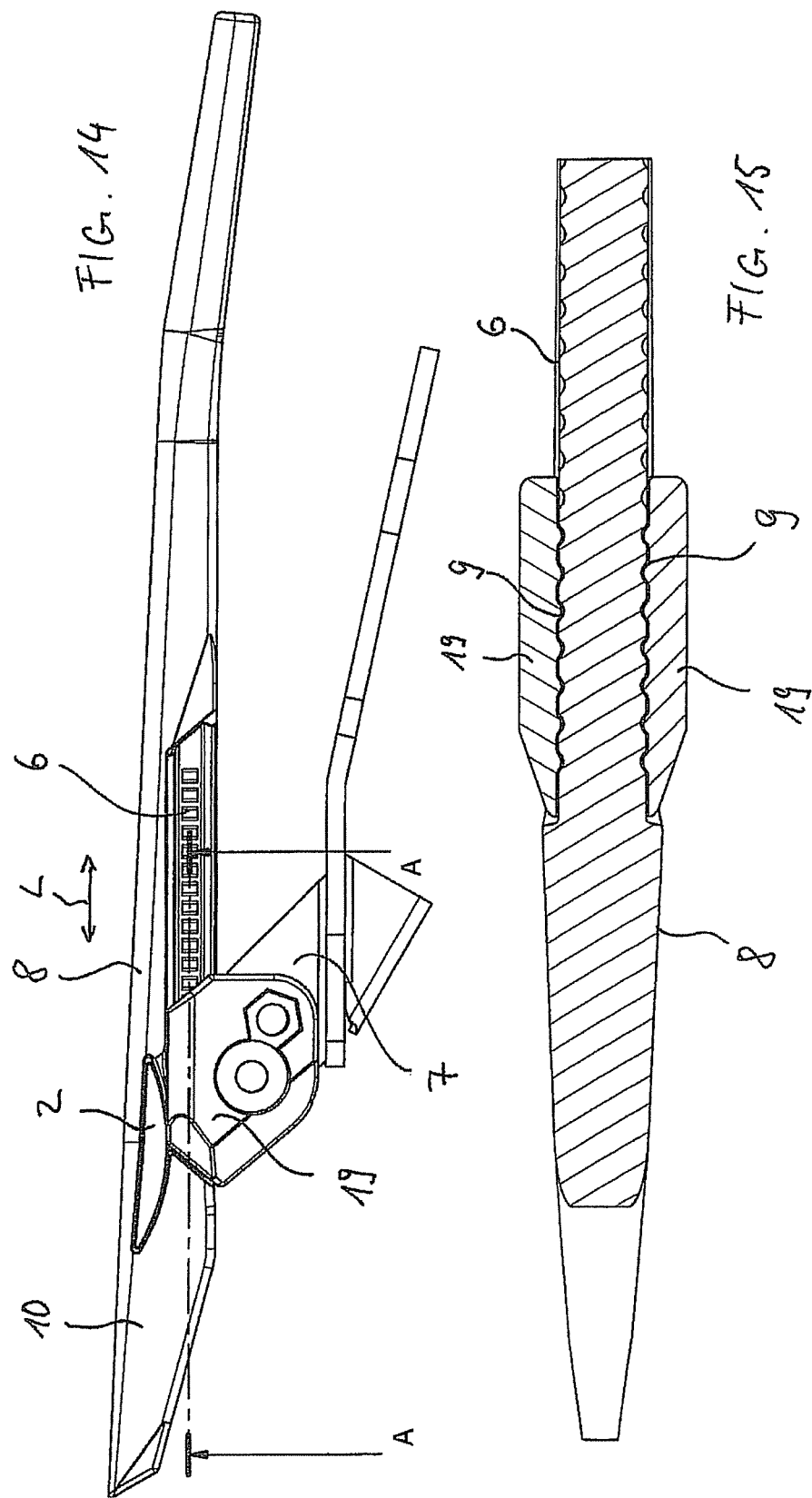

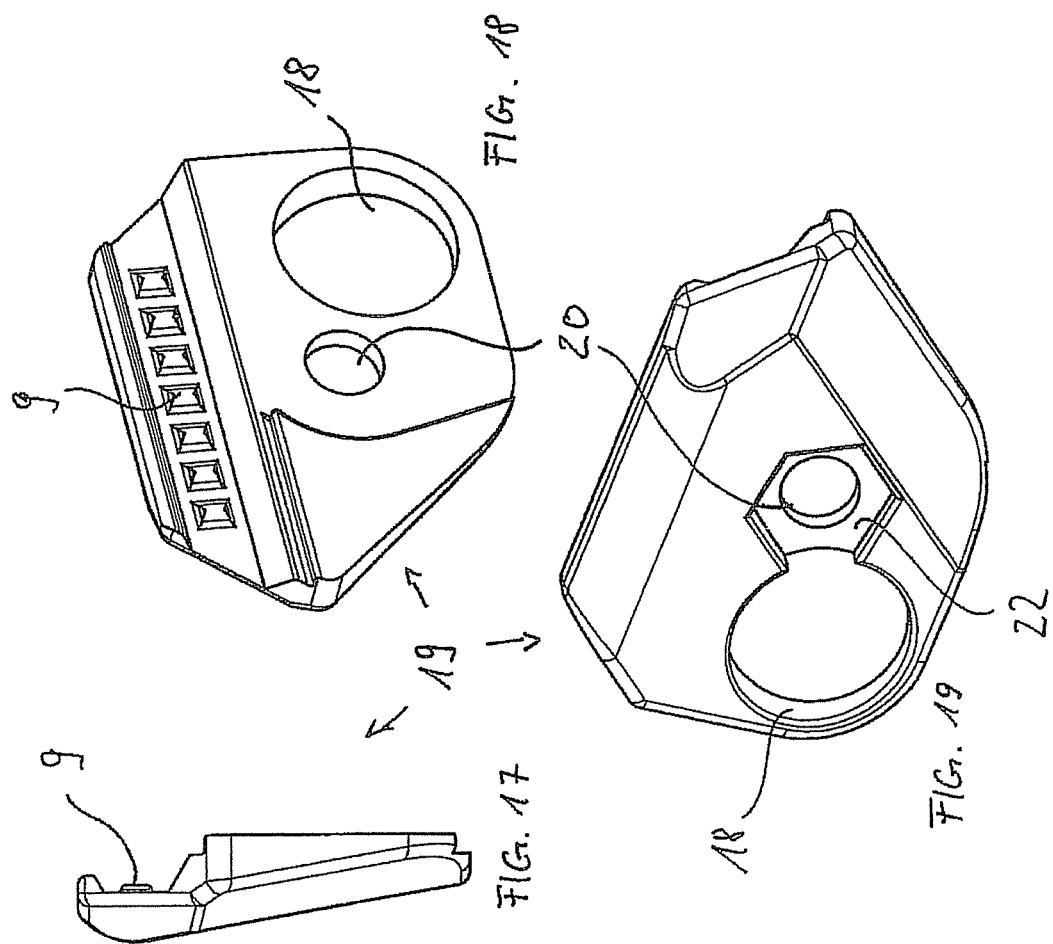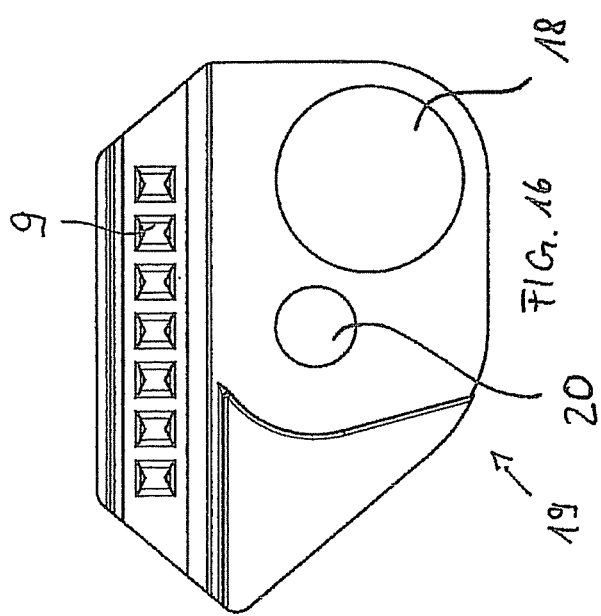

CROP LIFTER

CROSS-REFERENCE TO RELATED APPLICATION

This application claims priority to German Patent Application No. 102012100302.5, filed Jan. 13, 2012. The entire disclosure of the above application is incorporated herein by reference.

FIELD

The disclosure relates to a crop lifter for a mower of a harvesting machine with a support bar attachable to the mower. The support bar has a carrier and a lifter rod provided on the carrier or the lifter rod connected to the support bar.

BACKGROUND

From the State of the Art, a so-called grain lifter is known that slides with the front part of the support bar, on which a halm lifter is attached, over the ground or moves slightly above the ground. It picks up the halms of the crops lying on the ground with the halm lifter. Thus, these can be cut by the cutter of the mower and the heads can, for example, be transported to a threshing device. DE 23 25 916 A illustrates such a grain lifter where the halm lifter consists of a continuously U-shaped part. The legs get increasingly shorter starting from the weld seam of the halm lifter at the support bar to the free end of the halm lifter.

Concerning crops that carry fruit not at the top of comparably long stems, as it is the case with grain, but that grow on bushes, as for example pulses, the fruit or husks are distributed within the whole bush and also in the area of the bush close to the ground. Thus, it is desirable to cut such crops especially close to the ground and to lift them by means of special lifters so that no fruit is destroyed by the mower. In the above described grain lifter, a modification is used where the leading tip of the halm lifter projects downwards so far, to be guided in an ideal manner directly above the field surface. The grain lifters are, however, often damaged by stones in the ground and have to be exchanged or repaired in a laborious manner. WO 2006/072158 A1 discloses a grain lifter, where it is proposed to arrange a lifter rod detachably on a supporting structure. Thus, the lifter rod is separately exchangeable and an exchange of the whole grain lifter is prevented. A disadvantage is that an exchange of the supporting structure, if this is necessary, is laborious and that the frequency of failures of the lifter itself is not reduced.

SUMMARY

It is an objective of the disclosure to provide a crop lifter that is less failure-prone and/or is repairable with less effort. The objective is accomplished by a crop lifter with a support bar attachable to the mower. The support bar has a carrier. A lifter rod is detachably mounted on the carrier. The lifter rod is connectable at a multitude of positions to the carrier distanced in the longitudinal direction of the lifter rod, to the carrier. Preferred embodiments and advantageous improvements form part of the respective dependent claims.

The term crop lifter does not mean any limitation to a specific crop, like grains or pulses. The crop lifters according to the disclosure are suitable for any type of crops. Specifics in the processing of certain special crops are described separately, if necessary.

The crop lifter for a mower of a harvesting machine according to the disclosure comprises a support bar attachable on the mower. The support bar has a carrier for a lifter rod, generally at the front end of the support bar, when viewed in a working direction. The working direction generally corresponds to the driving direction of the harvesting machine. The lifter rod is detachably mounted on the profile carrier. An advantage of the crop lifter according to the disclosure is that the lifter rod is detachable and exchangeable separately from the carrier. When damage occurs, this exchange can be carried out quickly and simply. The replacement parts, in the form of the separate lifter rods, are distinctly smaller, lighter and cheaper than a complete one-piece grain lifter.

According to the disclosure, the lifter rod is connectable to the carrier at a multitude of positions distanced in the longitudinal direction of the lifter rod. The longitudinal direction corresponds to a main extension direction of the lifter rod. The lifter rod is generally essentially rod-like or blade-like. The crop lifter according to the disclosure enables, in an advantageous manner, an adjustment of the lifter rod in the longitudinal direction. Thus, it offers a possibility to especially accurately adjust the height of the leading tip of the lifter rod above the ground and to guide it with the smallest possible distance to the ground. Furthermore, according to the disclosure, the connection is achievable at discrete positions along the lifter rod. The connection is especially preferred as a form-fitting connection. Thus, a form-fitting connection between the lifter rod and the carrier is in the longitudinal direction of the lifter rod. Thus, in this direction the largest force acts on the connection. The adjustability at discrete positions, i.e., at finite, countable positions, has the advantage, compared to continuous adjustability, that at a known distance of the positions to each other, an adjustment to a specific measurement is enabled without the use of a measuring device.

According to another preferred embodiment, the lifter rod has a connection portion that extends in the longitudinal direction along the lifter rod. The attachment device on the carrier interacts with the connection portion. The attachment device has a clamping jaw arrangement and/or a serration. The serration on the carrier is preferably provided on one clamping jaw. The corresponding clamping jaw can, for example, be manufactured integrally with a serration as a casting or injection molded part. Alternatively, the serration can be formed on at least one insert where at least one clamping jaw of the carrier form fittingly accommodates an insert.

According to a further preferred embodiment, the lifter rod has in the connection portion a counter serration. The counter serration interacts with the serration on the carrier.

According to a further preferred embodiment, the carrier is rotatably adjustable via a rotational axis arranged transversally to the working direction. Thus, the angle between the lifter rod and the support bar can be adjusted. The position of the leading tip of the lifter rod can additionally be adjusted relative to the ground.

Preferably, the carriers are made from a stable material that is elastically deformable, without deforming plastically.

According to a further object, the lifter rod has a leading end, when viewed in working direction, with a through opening provided in the lifter rod to facilitate an elastic deformation of the lifter rod when a force is applied to the leading end. The through opening causes buckling of the lifter rod in the area of the through opening. This represents a structural weakening and facilitates an elastic deformation. If the leading end of the lifter rod, during the operation on a crop lifter, collides, for example, with a stone that causes an essential force impact onto the lifter rod, the lifter rod deflects more easily and evades the obstacle by means of elastic deformation without damaging the crop lifter. The lifter rod subsequently springs back to its original shape. The lifter rod can especially advantageously be used, where the leading end of the lifter rod is guided especially low, for example, directly above the ground surface. This is the case during the harvest of pulses, for example, beans, especially soy beans.

According to a preferred embodiment, the opening is arranged, at least portion-wise, between the leading end and the connection portion that attaches on a carrier. Preferably, the through opening has a main extension direction along a longitudinal direction of the lifter rod. The through opening is at least double as long, in the longitudinal direction, as transversally to the longitudinal direction. Preferably, the through opening converges at its ends in longitudinal direction under an acute angle. Furthermore, the through opening is preferably closed by a web. The web does not resist essentially to a deformation of the through opening.

In a further object, a crop lifter for a mower of a harvesting machine comprises a support bar attachable on the mower. The lifter rod is connected to the support bar as described above.

In a further object, a crop lifter for a mower of a harvesting machine comprises a support bar attachable on the mower. A lifter rod is connected to the support bar. The support bar has a recess for attachment on the mower. A bolting face is worked into the upper face of the support bar around the recess. Thus, planes, defined by the bolting face and the upper face, enclose an acute angle. The bolting face is the face on which the head of a threaded bolt or a threaded nut acts during the tightening of a screw connection. The corresponding faces on the head or on the nut are aligned parallel to the upper face of the support bar. Thus, they are tilted by the acute angle towards the bolting face. A tensioning of the screw connection is produced that does not affect the strength of the screw connection. A loss prevention for the whole crop lifter is achieved in an advantageous manner. During an unintentional detaching of the screw connection, the crop lifter can, when viewed in the working direction, move forward. The screw connection is again tightened in an advantageous manner as the bolting face moves automatically wedge-like under the threaded nut or the screw head. A further advantage for the handling of the crop lifter is that no securing measure to secure the screw connection needs to be provided. Thus, in the case of an exchange of the crop lifter, necessitated by damage, it would have to be loosened in a cumbersome manner. By means of the inclined bolting face, a screw connection, which is simple to detach, can be used. Preferably, the acute angle has an angular dimension of less than 5 degrees, preferably less than three degrees and particularly of approximately 1.5 degrees. Angles of less than 0.5 degrees are too flat, so that the technical effect according to the disclosure cannot be achieved.

According to a preferred embodiment, a recess is formed as an elongated hole extending in the working direction and/or the recess is open towards a rear end of the support bar, when viewed in the working direction. Thus, a disassembly and assembly of the crop lifters according to the disclosure is possible without a complete removal of the bolt out of the nut. The support bar has preferably a receptacle for a mowing finger on the mower of the harvesting machine. By means of this receptacle, the crop lifter is pushed onto the mowing finger pointing forward in the working direction. The last described crop lifter can have a detachable lifter rod. However, also one-piece crop lifters may be included where the lifter rod is rigidly connected to the support bar.

In a further object, a crop lifter for a mower of a harvesting machine comprises a support bar attachable on the mower. The support bar has a carrier and a lifter rod is detachably mounted on the carrier by a clamping jaw arrangement with two clamping jaws.

According to the disclosure, at least one of the two clamping jaws is detachable. The other of the two clamping jaws remains retained on the carrier. Thus, a defect lifter rod can be exchanged in an especially advantageous manner. Alternatively, the lifter rod can be adjusted in the longitudinal direction L without the pre-adjusted angle for the lifter rod getting lost. The second clamping jaw remains retained on the carrier. The detached clamping jaw can be adjusted to the same angle position in a simple manner like the stationary clamping jaw. Thus, the new lifter rod is exactly aligned. In light of the large number of exchanges of defective lifter rods during each harvesting season, the omission of the need of aligning the angle represents a simplification of the work and is time saving.

According to a preferred embodiment, the clamping jaws are respectively attached with a separate attachment means on the carrier. Thus, it does not matter which clamping jaw is detached. The respective other jaw remains fixed to the carrier. The clamping jaws have one first recess to fixingly accommodate the bolt and a second recess as an access to a bolt of the respective other clamping jaw. The second recess enables, in an advantageous manner, to secure the bolt of the respective other clamping jaw with a counter element, i.e. a nut, on the carrier. This means, the first receptacles have, respectively, a smaller bore than the second receptacles. Thus, an attachment is only possible to the first receptacles. The first receptacles can preferably have a recess corresponding to the head shape of the bolt head, to facilitate the tightening of the nut.

Further areas of applicability will become apparent from the description provided herein. The description and specific examples in this summary are intended for purposes of illustration only and are not intended to limit the scope of the present disclosure.

DRAWINGS

All here described objects of the disclosure are combinable deliberately in any manner. Preferred embodiments are described in the following with reference to the drawings.

FIG. 2 is a side view of the crop lifter according to FIG. 1.

FIG. 3 is a top plan view of the crop lifter according to FIG. 1.

FIG. 4 is a cross-section view along the line A-A of FIG. 2.

FIG. 5 is a sectional view along the line J-J of FIG. 2.

FIG. 6 is a side view of the detail G of FIG. 2.

FIG. 7 is a top plan view onto the detail according to FIG. 6.

FIG. 8 is a sectional view along the line H-H of FIG. 7.

FIG. 14 is a side elevation view of a further embodiment of a crop lifter.

FIG. 15 is a sectional view along the line A-A of FIG. 14.

FIG. 16 is a side elevation view of a clamping jaw.

FIG. 17 is a front plan view of the clamping jaw.

FIG. 18 is a perspective view of the clamping jaw.

FIG. 19 is a perspective view of the clamping jaw.

DETAILED DESCRIPTION

Figure 1:
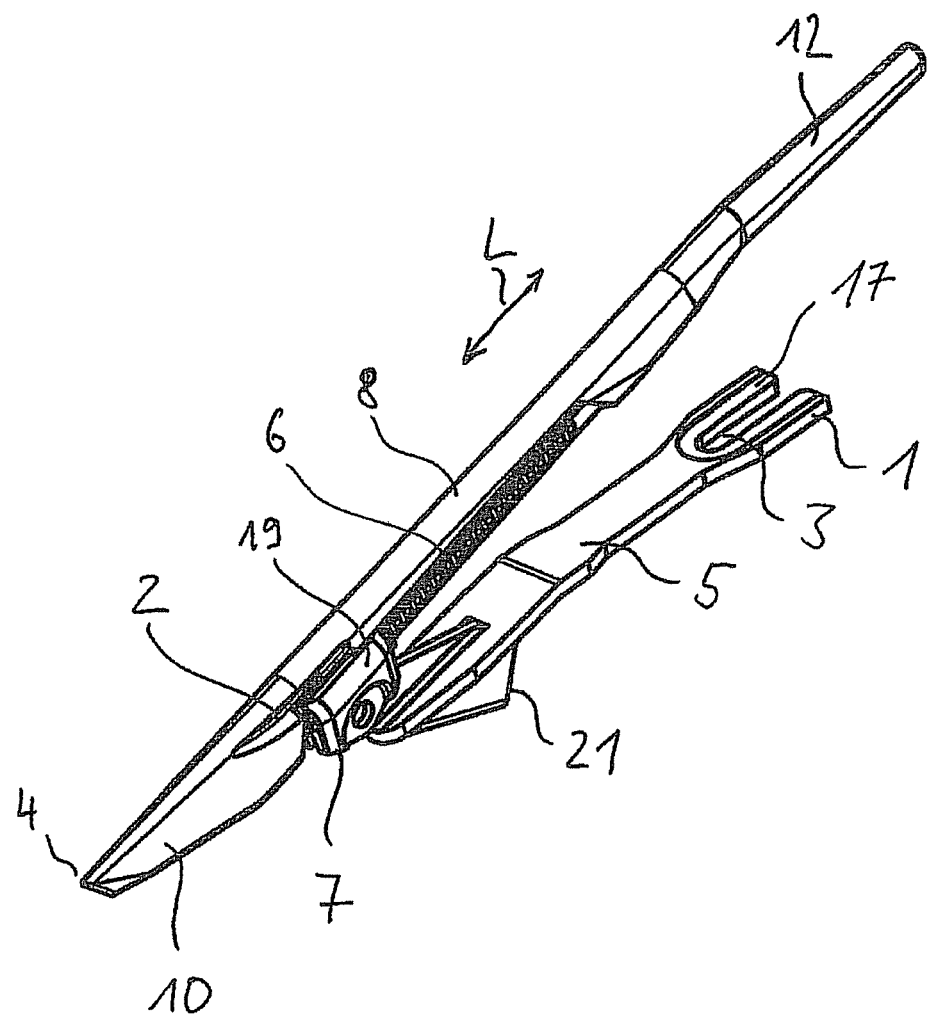
FIG. 1 is a perspective view of a crop lifter.

FIG. 1 illustrates a crop lifter according to the disclosure shown in a perspective view. The crop lifter includes a support bar 5 that attaches the crop lifter on a mower of a harvesting machine. The support bar 5 has a recess 3 at its rear end 1. The recess 3 is formed as an elongated hole open towards the rear end 1. The recess 3 can be moved onto a threaded bolt on the mower and can be secured with a threaded nut (not shown). Simultaneously, a receptacle 21 on the support bar 5 is pushed onto a mowing finger (not shown) of the mower. An advantage of the embodiment with the elongated hole 3 is that an assembly of the support bar is possible on different types of fingers even if the mowing fingers have different lengths and thicknesses. A bolting face 17 that encloses the recess 3 is described in detail later.

The support bar 5 has a carrier 7 at its front end. A lifter rod 8 is detachably mounted to the carrier 7. The lifter rod 8 is connectable at a multitude of positions to the carrier 7, distanced in longitudinal direction L of the lifter rod 8. For this, the carrier 7 has, in the shown embodiment, two clamping jaws 19. The jaws 19 are clampable against each other and act on a connection portion 6 of the lifter rod 8. The lifter rod 8 is an approximately rod-like component, elongated in the longitudinal direction designated by the double arrow L. A head portion 10 is at its leading end 4. The head portion 10 is guided as low as possible above the ground. The head portion 10 can, for example, be formed dart-like, starting from the tip at the lead end 4 widening to the rear. A center portion of the lifter rod 8, with the connection portion 6, has an essentially constant cross-section. An end 12 of the lifter rod 8 converges rearward slightly. The construction of the connection portion 6 and of a through opening 2 of the lifter rod 8 are described in the following with reference to the further Figures.

In FIGS. 2 and 3 the crop lifter according to FIG. 1 is shown in two views. FIG. 2 shows the mounting position in a side view. FIG. 3 shows a view from above. A working direction is represented by the arrow designated with R. It is the working direction of the not shown mower which generally corresponds to the driving direction of the harvesting machine. This means, that the crop lifter moves during operation in the direction of the arrow R through the crops, straightens and aligns them at the same time, to guide them to the mower such that the crops are cut at the stem and no fruit is damaged. For adaption to different types of crops, the carrier 7 can be rotatably adjustable around a rotational axis extending transversally to the working direction R. The lifter rod 8 is connectable at a multitude of positions, distanced in its longitudinal direction, to the carrier 7. For this, the carrier 7 interacts with the connection portion 6, which defines the maximum adjustment range. It can also be considered that the clamping jaws 19 of the profile carrier 7, clampable against each other, work themselves into the connection portion 6. Thus, a connection is made based essentially on a frictional connection.

According to a preferred embodiment, the lifter rod 8 is connectable in a form-fitting manner to the carrier 7. For this, the connection portion 6 has a projection, which meets with a complementary formation on the carrier 7. Thus they can correspondingly engage each other and make a form-fitting connection in the longitudinal direction L. In general, a serration is selected as the projection. By means of the form-fitting connection, a stable connection between the carrier 7 and the lifter rod 8 is advantageously produced at lower tightening forces on the carrier 7, than necessary with a frictional connection based on clamping force.

The head portion 10 of the lifter rod 8 is guided for specific crops, for example for the harvesting of beans, extremely low over the ground surface. The head portion 10 may even penetrate the ground. The head portion 10 prevents the husks growing at the bottom of the bush from being destroyed by the mower. In the process the lifter rod 8 is exposed to extremely strong loads. Thus, the wear on the lifter rods 8 is comparably high. It has been shown to be advantageous to manufacture the lifter rods 8 from a material that is comparably advantageous during the manufacture, however, robust and especially easy elastically deformable. If the head portion 10 collides, for example, with stones in the ground, the lifter rod 8 is elastically deformed and returns essentially to its original shape.

To support the elastic deformability of the head portion 10, the lifter rod 8, according to the disclosure, has a through opening 2. The through opening 2 extends transversally to the longitudinal or working direction through the lifter rod 8. The through opening 2 extends in the longitudinal direction L between the front end 4 of the lifter rod 8 and the connection portion 6. Preferably, it is in a transition portion between the head portion 10 and the connection portion 6. In the connection portion 6 the carrier 7 holds the lifter rod 8. A connection portion 6 that is not deformed would be desirable. Otherwise the form-fitting connection to the carrier 7 could be detached which might lead to the loss of the lifter rod 8 during the harvesting operation. The through opening 2 represents a weakening of the lifter rod 8 in the transition portion between the head portion 10 and the connection portion 6.

Advantageously, the head portion 10 is deflected to the side under the application of a strong force. The connection portion 6 is essentially not deformed. A force transmission from the head portion 10 to the connection portion 6 does practically not take place via the transition portion weakened by the through opening 2. After an impact, the head portion 10 is elastically returned to its original position. The through opening 2 can be formed continuously which, however, is not compulsory. According to a preferred embodiment, the through opening 2 is closed by a web 16. The resistance of the web to deformation is essentially lower than that of the head portion 10. An advantage of the closed through opening 2 is that no stems or similar matter can be caught in the through opening, which could influence the mowing performance.

In connection with FIGS. 4 and 5, the form-fitting connection between the lifter rod 8 and the carrier 7 is described in detail in the following. FIG. 4 shows a cross-sectional view along the line A-A of FIG. 2. FIG. 5 also shows also a sectional view along the line J-J of FIG. 2. The cross-sectional view in FIG. 4 shows the carrier 7 with the lifter rod 8. The lifter rod 8 is held by a clamping jaws arrangement 15. The clamping jaw arrangement 15 engages an area below the through opening 2, which is closed by a comparably thin web 16. The clamping jaw arrangement 15 includes two clamping jaws 19. The two clamping jaws 19 act against and are clampable against each other. Also, three or more clamping jaws may be considered which could act on a connection portion 6 of the lifter rod 8 adapted correspondingly in shape. The longitudinal direction L of the lifter rod 8 is aligned in FIG. 4 vertically to the drawing plane. In the other spatial directions, the clamping jaws 19 enclose the lifter rod 8 such that a form-fitting connection is achieved.

In the longitudinal direction L, this form-fitting connection is realized, in the shown embodiment, by inserts 11. The inserts 11 are arranged between the clamping jaws 19 and the connection portion 6 of the lifter rod 8. In FIG. 5 it is visible, that the inserts 11 are retained in the longitudinal direction L again form-fittingly on the clamping jaws 19. The inserts 11 have at their side, facing the connection portion 6 of the lifter rod 8, a serration 9. The serration 9 interacts with a corresponding counter serration of the connection portion 6. The serration 9 achieves a connection based mainly on the form-fitting connection of the components. The inserts 11 have the advantage that they are exchangeable. Thus, lifter rods 8 with different formations on the connection portions 6 can be used. Thus, inserts 11, congruently formed, are made available. Furthermore, the inserts 11 can be more easily exchanged, when the serration is damaged by excessive application of force.

Referring to FIGS. 6 to 8, the attachment of the support bar 5 to the mower is described in detail. FIG. 6 shows a side view in detail of FIG. 2 designated with G. FIG. 7 shows a top plan view of the detail of FIG. 6. The support bar 5 has, in the shown embodiment which corresponds to the crop lifter shown in FIG. 1, a recess 3 for attachment on the mower (not shown). The recess 3 is formed as an elongated hole extending in the working direction R. According to a preferred embodiment, the recess 3 is open towards the rear end 1 of the support bar 5 when viewed in working direction R. In FIG. 8 an enlarged sectional view along the line H-H of FIG. 7 is shown. Around the recess 3, a bolting face 17 is worked into the upper face 14 of the support bar 5. The planes that define the bolting face 17 and the upper face 14 enclose an acute angle A. The angular dimension is less than 5 degrees, preferably less than three degrees and particularly of approximately 1.5 degrees in the shown embodiment.

Figure 9:
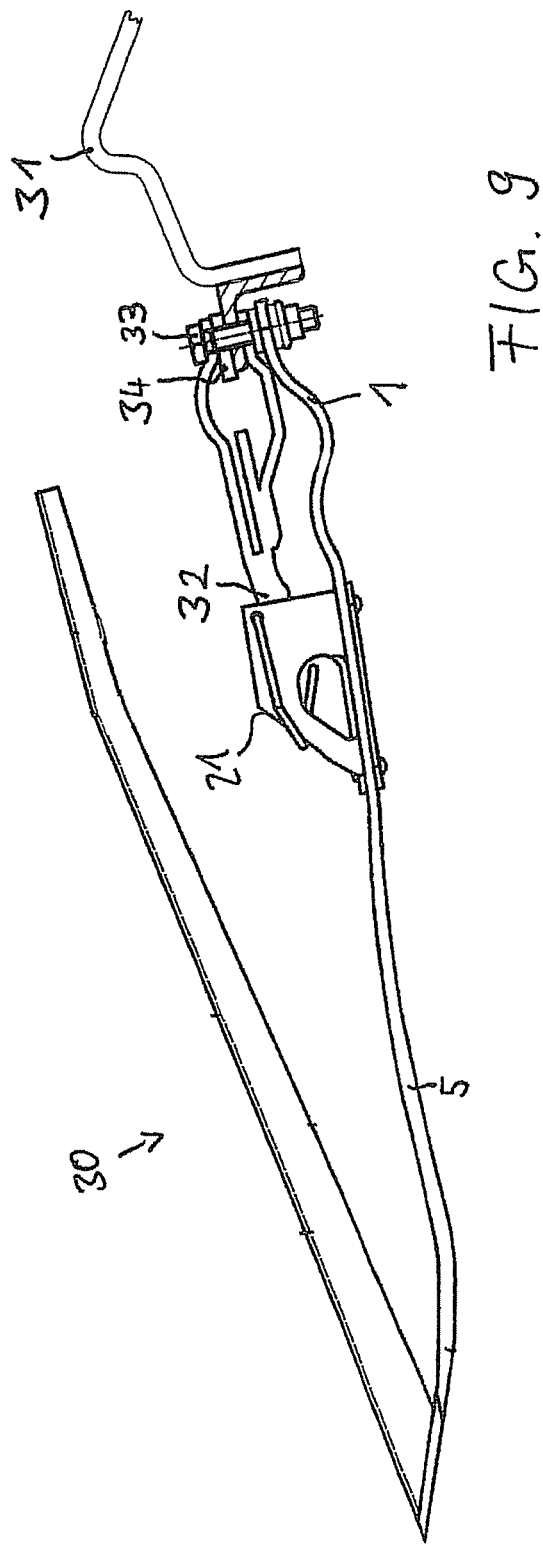
FIG. 9 is a side elevation view of a one-piece embodiment of the crop lifter mounted on a sickle bar and a mowing finger of a harvesting machine.

In FIG. 9, the sickle bar 31 is visible in a schematical representation. A mowing finger 32 projects from the sickle bar 31. The mowing finger 32 is retained, via a screw, 33 on the sickle bar 31. Into the drawing plane or out of the same, several further mowing fingers 32 are assigned to the sickle bar 31 with distance between each other. The mowing fingers 32 serve to guide a cutter bar 34, which has cutting blades for cutting the crops. The shown crop lifter 30 corresponds to the state of the art. On such a mower, the crop lifter according to the disclosure is attached. The rear end 1 of the support bar 5 is, for example, retainable by means of a screw 33 on the sickle bar 31. The support bar 5 is, preferably, made from a sheet material and has bending elastic properties. The support bar 5 is supported, via attachment means, in the form of the receptacle 21 on the mowing finger 32. The receptacle 21 is, for example, connected by means of rivets to the support bar 5.

Figure 10:
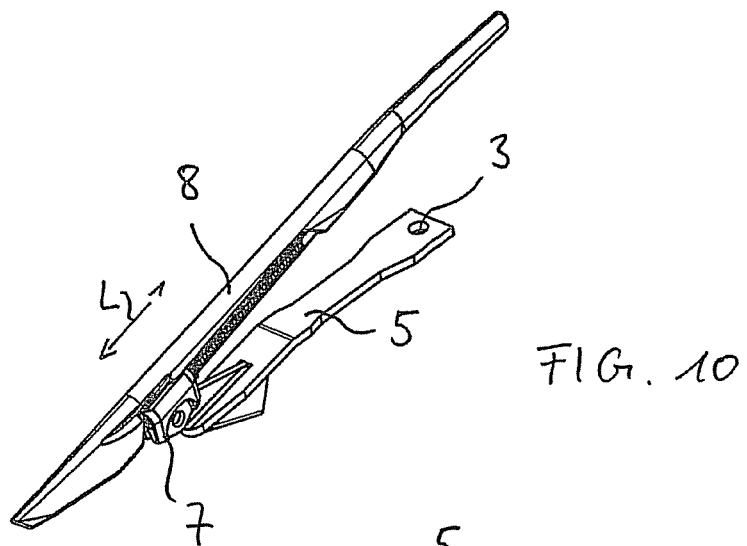
FIG. 10 is a perspective view of a further embodiment of a crop lifter.

In FIG. 10, an alternative embodiment to the support bar 5 to the crop lifter shown in FIG. 1 is shown. For attachment, the support bar 5 has a recess 3 in form of a circular bore. A circular bore is less cumbersome to manufacture compared to the elongated hole or the elongated hole open towards the rear end, as in FIGS. 6 to 8.

Figure 11:
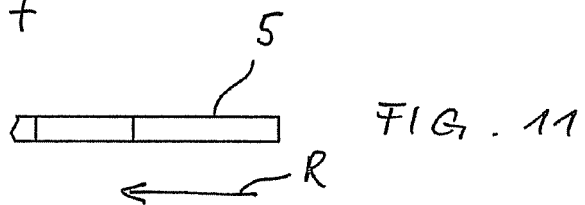
FIG. 11 is a side elevation view of a detail corresponding to FIG. 6, however in the embodiment of the crop lifter according to FIG. 10.
Figure 12:
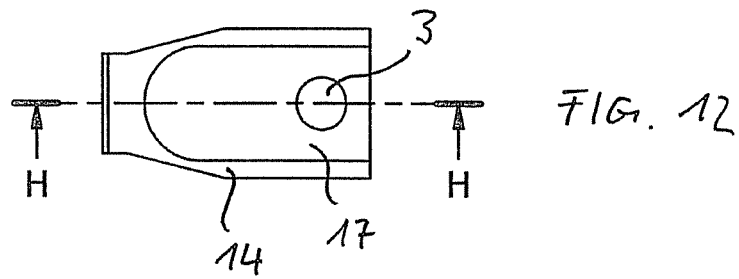
FIG. 12 is a top plan view onto the detail of FIG. 11.
Figure 13:
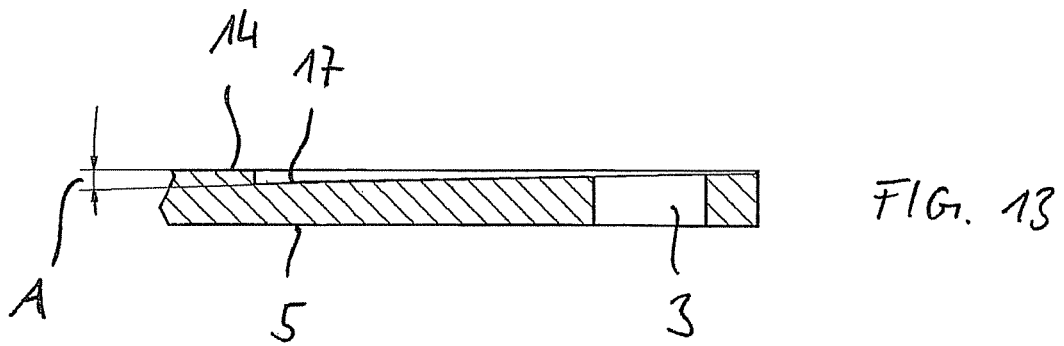
FIG. 13 is a sectional view along the line H-H of FIG. 12.

Referring to FIGS. 11 to 13 again, the attachment of the support bar 5 on the mower is described in detail. FIG. 11 shows a side elevation detail of the support bar 5 of FIG. 10. FIG. 12 shows a top plan view detail of FIG. 11. The support bar 5 has, in the shown embodiment which corresponds to the crop lifter shown in FIG. 10, a recess 3 for the attachment on the mower (not shown here). The recess 3 is formed as a circular bore. In FIG. 13, an enlarged sectional view along the line H-H of FIG. 12 is shown. Around the recess 3, a bolting face 17 is worked into the upper face 14 of the support bar 5. The planes, defined by the bolting face 17 and the upper face 14, enclose an acute angle A. The angular dimension is, preferably, approximately 1.5 degrees.

In FIG. 14, a further embodiment of the crop lifter according to the disclosure. For adaptation to different types of crops, the carrier 7 can be rotatably adjusted around a rotational axis. The lifter rod 8 is connectable at multitude positions, distanced in its longitudinal direction L, to the carrier 7. For this purpose, the carrier 7 and the connection portion 6 interact. The connection portion also indicates the maximum adjustment range. According to a preferred embodiment, the lifter rod 8 is connectably form-fitting to the carrier 7. For this purpose, the connection portion 6 has a formation, which meets with a complementary equivalence on the carrier 7. Thus, the formations can correspondingly engage each other and form such a form-fitting connection in the longitudinal direction L. A serration is generally selected as the formation. By means of the form-fitting connection, a stable connection between the carrier 7 and the lifter rod 8 is already established at lower tightening forces on the carrier 7.

The head portion 10 of the lifter rod 8 is guided for specific crops, as for example for the harvest of beans, extremely low above the ground surface. In this case, it may even penetrate the ground. When the head portion 10, for example, collides with stones in the ground, the lifter rod 8 is elastically deformed and returns essentially to its original shape. To facilitate the elastic deformability of the head portion 10, the lifter rod 8 has a through opening 2. The through opening 2 extends transversally to the longitudinal direction through the lifter rod 8. The through opening 2 extends in longitudinal direction L between the front end 4 of the lifter rod 8 and the connection portion 6. The opening 2 is in a transition portion between the head portion 10 and the connection portion 6. The carrier 7 holds the lifter rod 8 at the connection portion 6. Thus, it is desirable that the connection portion 6 is not deformed, as otherwise the form-fitting connection to the carrier 7 could be detached, which may lead to a loss of the lifter rod 8 during the harvesting operation.

The through opening 2 represents a weakening of the lifter rod 8 in the transition portion between the head portion 10 and the connection portion 6. Advantageously, the head portion 10 is deflected to the side under a strong application of force. Thus, the connection portion 6 is essentially not deformed. A force transmission from the head portion 10 to the connection portion 6 practically does not take place via the transition portion weakened by the through opening 2. Especially after the discontinuation of the load application, the head portion 10 is again elastically returned to its original position. The through opening 2 may, in this case, be formed continuously, which however is not mandatory. According to a preferred embodiment, the through opening 2 is closed by a web 16. The resistance of the web to deforming is essentially lower than that of the head portion 10.

In connection with FIG. 15, the form-fitting connection between the lifter rod 8 and the carrier 7 is described in detail in the following. An essential difference of the shown embodiment to the crop lifter according to FIGS. 1 to 5 is described. FIG. 15 shows an enlarged sectional view along the line A-A of FIG. 14. The sectional view shows the lifter rod 8 clamped by two opposite acting clamping jaws 19 of a clamping jaws arrangement. The clamping jaws 19 have a serration 9 on their side facing the connection portion 6 of the lifter rod 8. The serration 9 interacts with a corresponding counter serration of the connection portion 6. The serration 9 provides a connection mainly based on a form-fitting connection of the components. Providing the serration 9 directly on the clamping jaw 19 has the advantage, that the use of components which can easily be lost can be prevented.

In FIGS. 16 to 19, the clamping jaw 19 of the crop lifter according to FIG. 14 is shown in four different views, which are described together. The serration 9 has a row of teeth on the inside of a half shell-like receptacle for the connection portion of the lifter rod 8 (not shown). The recesses 18 and 20 of the clamping jaws 19 differentiate these from those clamping jaws shown in FIGS. 1 to 5 and 10. The clamping jaw 19 shown in FIGS. 16 to 19 is provided as a right-hand clamping jaw. When viewed in the working direction R, the clamping jaw 19 is attached on the carrier 7 by means of a bolt 23 and a nut 25 (see FIGS. 20 and 21) with a first recess 20. A tightening of the two clamping jaws 19 against each other does not take place. Rather, the second recess 18 of the clamping jaw 19 enables an undisturbed access to the screw connection of the respective other clamping jaw, as described in detail in the following in connection with FIGS. 20 and 21. The formation 22 around the first recess 20 serves as a form-fitting accommodation of a bolt head 23' in a rotational direction. The formation 22 is generally formed square or hexagon-like to simplify the tightening and loosening of a counter nut 25.

Figure 20:
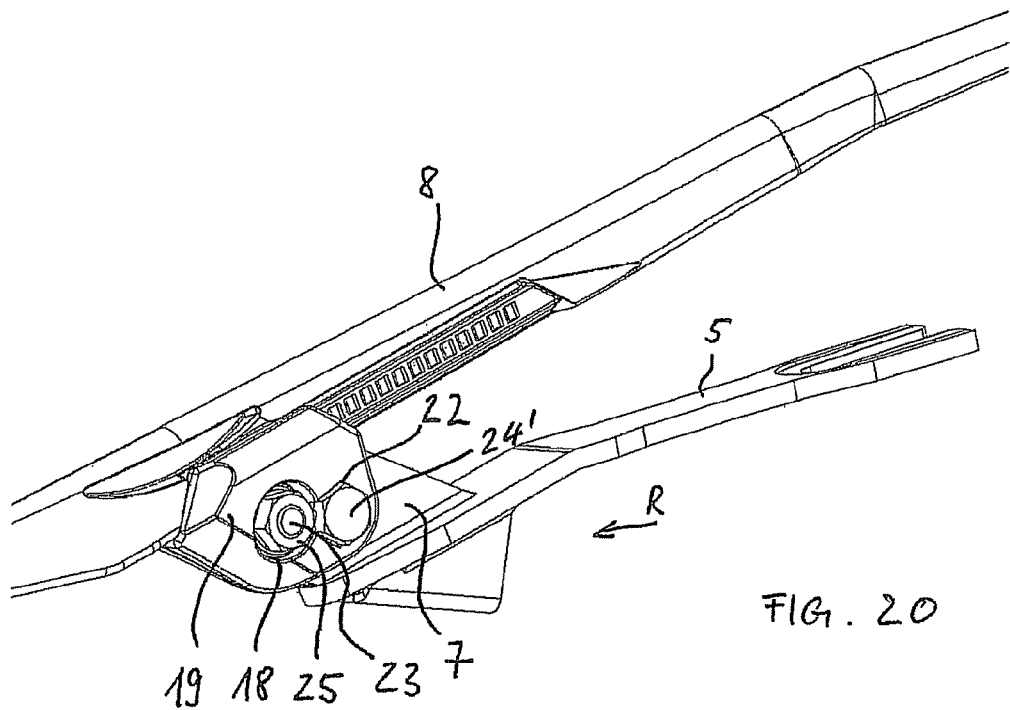
FIG. 20 is a perspective view of the crop lifter according to FIG. 14.
Figure 21:
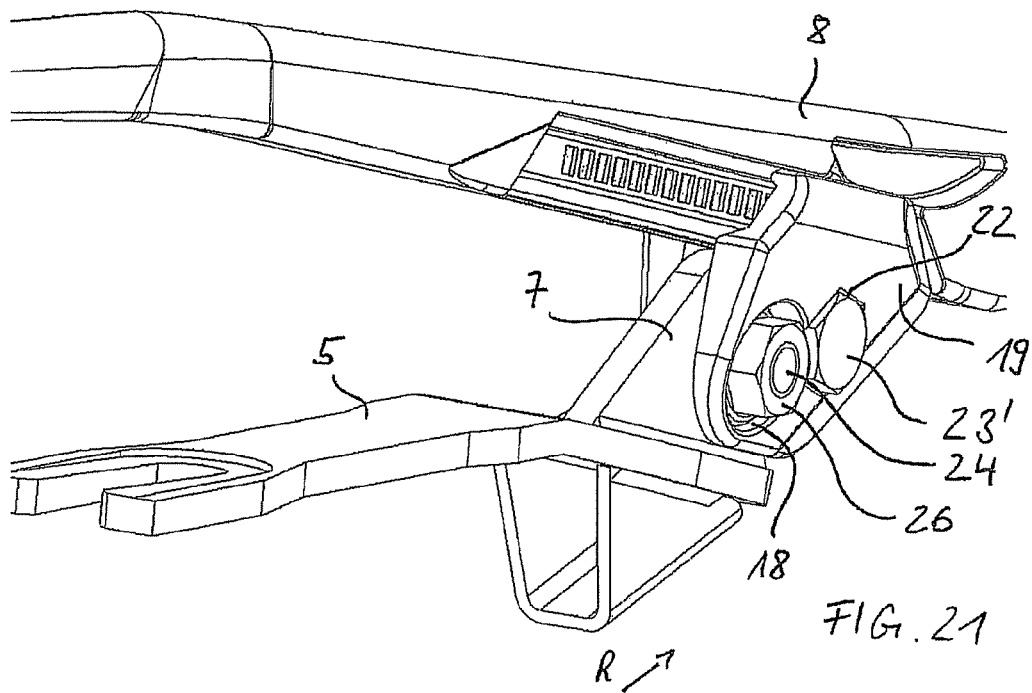
FIG. 21 is a perspective view of the crop lifter according to FIG. 14.

FIGS. 20 and 21 show the crop lifter of FIG. 14 in two perspective views. In FIG. 20, the left side, when viewed in working direction R, is visible. In FIG. 21, the right side is visible when viewed in working direction R. The left clamping jaw 19, visible in FIG. 20, also has the second recess 18 with a larger diameter than the first recess 20. Within the second recess 18, the bolt 23, attaching the left clamping jaw 19, is visible. The bolt 23 is secured by the nut 25. A detaching of the nut 25 and thus a detaching of the right clamping jaw 19 is possible without having to detach the left clamping jaw 19. This retains the pre-adjusted angle of the lifter rod 8. Thus, the relative position of the left clamping jaw 19 to the carrier 7 remains unchanged while the lifter rod 8 is exchanged, for example because of a defect. The left clamping jaw 19 is also attached by means of a bolt 24 through the first recess 20 on the carrier. In FIG. 20, only the bolt head 24' is visible. The bolt head 24' is form-fittingly accommodated in the hexagon-like formation 22 of the clamping jaw 19. In FIG. 21 it is visible, that the bolt 24 is secured by a nut 26. The second recess 18 of the right clamping jaw 19 enables visibly and also a detaching of the left clamping jaw 19 while the right clamping jaw remains attached on the carrier 7. Also the bolt head 23' is form-fittingly accommodated in the hexagon-like formation 22 of the right clamping jaw 19. This facilitates the detaching and tightening of the nut 25.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A crop lifter for a mower of a harvesting machine comprises:
   a support bar attachable on the mower, the support bar has a carrier;
   a lifter rod is detachably mounted on the carrier;
   wherein a retention mechanism is provided to retain the lifter rod on the carrier at any one of a multitude of discrete positions, distanced in a longitudinal direction of the lifter rod.

2. The crop lifter according to claim 1, wherein the lifter rod is form-fittingly retained on the carrier.

3. The crop lifter according to claim 1, wherein the lifter rod has a retention portion, the retention portion extends in the longitudinal direction along the lifter rod and an attachment device on the carrier interacts with the retention portion.

4. The crop lifter according to claim 3, wherein the attachment device comprises a clamping jaw arrangement and a serration.

5. The crop lifter according to claim 4, wherein the serration is arranged on at least one clamping jaw of the carrier.

6. The crop lifter according to claim 3, where the lifter rod comprises a counter serration at the retention portion and the counter serration interacts with the serration on the carrier.

7. The crop lifter according to claim 3, where the carrier is rotatably adjustable via a rotational axis arranged transversally to the working direction (R).

8. A crop lifter for a mower of a harvesting machine comprising a support bar, attachable on the mowing device, where the support bar has a carrier and a lifter rod is detachably retained in a plurality of positions on the carrier by a clamping jaw arrangement with two clamping jaws wherein at least one of the two clamping jaws is detachable, while the other of the two clamping jaws remains fixed on the carrier.

9. The crop lifter according to claim 8, wherein the clamping jaws are respectively attached by a separate attachment device on the carrier.

10. The crop lifter according to claim 8, wherein the clamping jaws have respectively one first recess for fixingly accommodating a bolt and a second recess as an access to a bolt of the respectively other clamping jaw.

* * * * *